May 21, 1968     F. H. PRESTWOOD     3,384,893
RADAR AUGMENTATION SYSTEM
Filed March 21, 1967
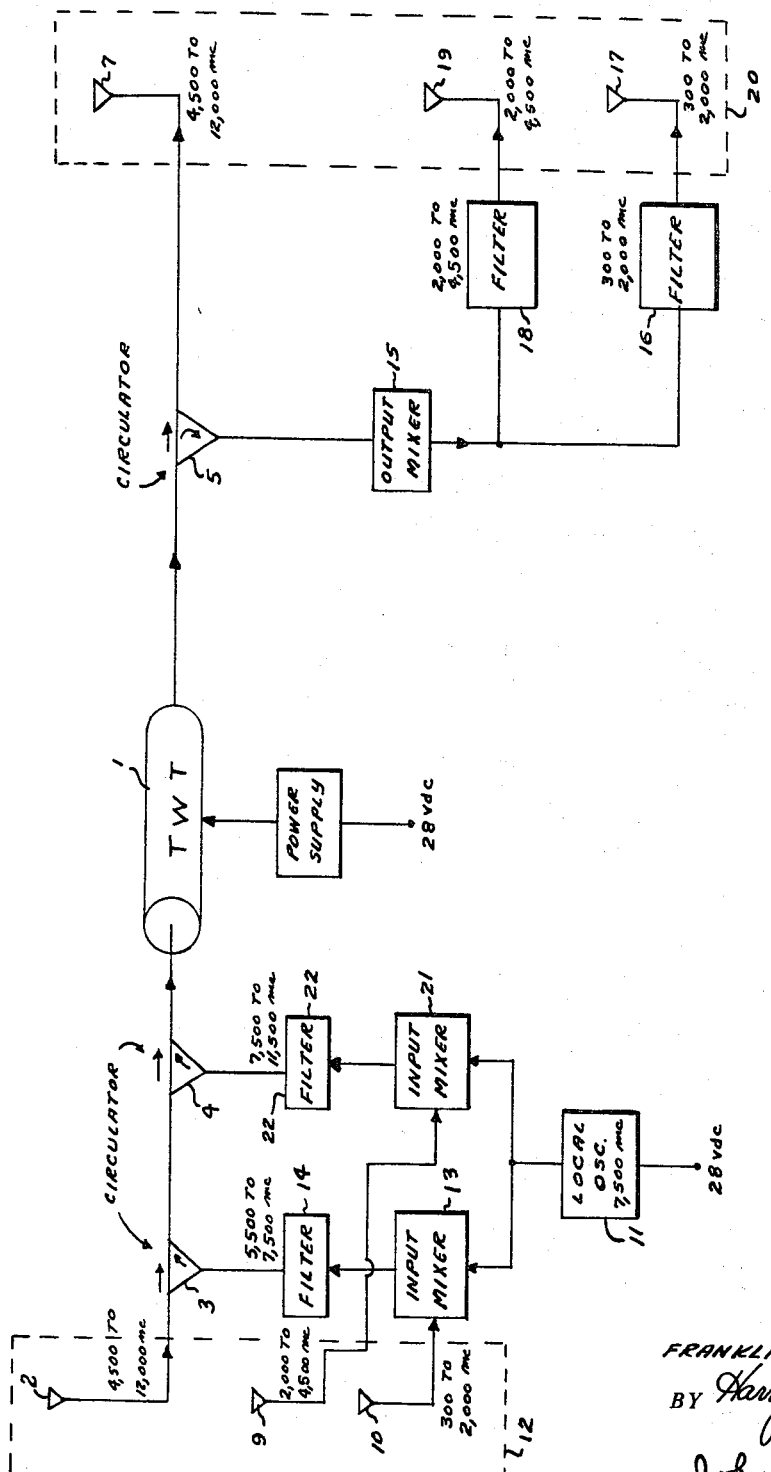
INVENTOR.
FRANKLIN H. PRESTWOOD
BY Harry A. Herbert Jr
ATTORNEY
John P. O'Brien
AGENT.

United States Patent Office 3,384,893
Patented May 21, 1968

3,384,893
RADAR AUGMENTATION SYSTEM
Franklin H. Prestwood, Valparaiso, Fla., assignor to the United States of America as represented by the Secretary of the Air Force
Filed Mar. 21, 1967, Ser. No. 625,565
1 Claim. (Cl. 343—6.8)

ABSTRACT OF THE DISCLOSURE

This invention relates to a radar amplifier system located at a remote target. The purpose of this amplifier system is to amplify the signals received at the remote target and retransmit the amplified signal back to its source. A novel heterodyning technique is employed in the amplifier system to permit the system to amplify signals that lay outside the normal band pass of the amplifier circuit employed in the system.

---

The invention described herein may be manufactured and used by or for the United States Government for governmental purposes without the payment to me of any royalty thereon.

Background of the invention

This invention relates to a radar system and more particularly, relates to a radar amplifier system which increases the apparent radar reflectivity of a target's cross-sectional area.

U.S. Patent No. 3,039,089 teaches the use of a radar amplifier system located at a remote target to augment the apparent size of the radar image reflected from the remote target. The amplifier system is described in this patent as consisting of a receiving antenna array, one or more traveling wave tube amplifiers and a transmitting antenna array. Such a radar amplifier system is known in the art as an augmenter system.

By using the augmenter system disclosed in the U.S. Patent No. 3,039,089, any desired cross section of a target can be simulated by receiving the incident radiation, amplifying the received signal and retransmitting the amplified signal to its source. The resulting image which appears on the radar screen at the source will be an image that is greatly magnified as compared with one which would appear where conventional equipment is employed.

There are many possible uses for augmenting the apparent size of a target. One important use is to assist in tracking a drone, missile, satellite or any small moving object.

The augmenter system of the type disclosed in U.S. Patent No. 3,039,089 has a major limitation for it can only amplify a signal whose frequency is within the augmenter amplifier's band pass. In general, radar amplifiers are narrow band or they have unused band widths (such as a TWT). Presently, a target vehicle would have to carry several augmenter systems having different frequency bands in order to cover all U.S. tactical radars. The employment of several augmenter systems in each target is not only costly but adds to the total weight of the target vehicle.

The augmenter system of the present invention requires the use of only one radar amplifier to cover several different frequency bands by means of a unique heterodyning technique, as will be explained herein.

Summary of the invention

The device described herein is an augmenter system whose function is to increase the apparent size of a target's cross-sectional area on the radar screen at the source. The augmenter system of the present invention comprises a receiving antenna array, a radar amplifier including unique heterodyning circuitry and a transmitting antenna array.

Briefly, the radar amplifier operates as follows. All the received signals within the band pass of the radar amplifier element are amplified straight through and then retransmitted. Received signals outside the band pass are heterodyned before the amplifier input in a mixer with a local oscillator voltage. The resulting side-band voltages which lie within the amplifier's band pass are passed through a filter and then amplified. These amplified sideband voltages are heterodyned in another mixer and sent through another filter which passes only the signal having the same frequency as the received signal. This signal is then retransmitted along with the signal that passed straight through the amplifier.

The object of the present invention is to reduce the augmentation cost by reducing the number of augmenter systems required in a target vehicle to one system which will cover several different frequency bands.

Brief description of the drawing

In the figure, there is shown in block diagram form an improved augmenter system.

Description of the preferred embodiment

In the preferred embodiment shown in the figure, the amplifier medium is represented as a travelling wave tube (TWT). However, it is not intended to limit this invention to a TWT amplifier. Any broad-band amplifier could be used. Also, this invention is not limited to operate in the specific frequency ranges mentioned below, which are given for illustration purposes only.

TWT 1 has a useful frequency band pass from about 4,500 through 12,000 mc. Radar input signals within this frequency range enter the system through input antenna 2 and pass straight through circulators 3 and 4 into TWT 1 where they are amplified. The amplified signals then travel through circulator 5 to output antenna 7.

Signals received at input antenna array 12 that are outside the TWT's band pass are amplified by employing a unique heterodyning method. For example, an augmenter system designed to be used with all tactical U.S. radar systems would cover a range from 300 mc. through 12,000 mc. Since the TWT's band pass is from 4,500 to 12,000 mc., this means that signals having a frequency from 300 mc. through 4,500 mc. could not be amplified by TWT 1. In order to explain the novel heterodyning technique, the method of amplifying signals in the 300 mc. to 4,500 mc. frequency range will now be explained.

In the figure, signals in the 300 mc. to 2,000 mc. frequency range enter the system through antenna 10 and signals in the 2,000 to 4,500 mc. frequency range enter through antenna 9. Assume a 1,300 mc. signal is received at antenna array 12. This signal is delivered from antenna 10 into input mixer 13 and is heterodyned with a local oscillator voltage from oscillator 11 (7,500 mc. frequency). Several major bands are produced including signals having frequencies of 1,300 mc., 6,200 mc., 7,500 mc. and 8,800 mc. Due to the filtering of filter 14 (5,500 mc. through 7,500 mc. band pass), only the local oscillator voltage at 7,500 mc. and the difference voltage at 6,200 mc. are permitted to pass through circulators 3 and 4 into TWT 1, and are then amplified.

The amplified voltages then pass through circulator 5 and into output mixer 15, where the 7,500 mc. and 6,200 mc. are heterodyned. Several side bands result in the output mixer, including those at 1,300 mc., 6,200 mc., 7,500 mc. and 13,700 mc. Due to the filtering action of filters 16 (300 mc. to 2,000 mc. band pass), the difference side band (1,300 mc.) is selected and passed to output antenna 17, where it is radiated back to the interrogating radar source. It is important to note that the departing signal (1,300 mc.) has exactly the same frequency as the input signal (1,300 mc.) received at antenna 10. Also note that the output mixer 15, is passive; that is, no output local oscillator is required. Output mixer 15 would require a local oscillator up to approximately five watts power without benefit of amplification of input local oscillator 11 by the TWT. Of course, the 6,200 mc. and the 7,500 mc. signals will pass on through and be radiated by antenna 7, but these are of no consequence.

The 2,000 to 4,500 mc. frequency signals entering the system through antenna 9 are amplified in the same manner. They are heterodyned in input mixer 21 with the local oscillator voltage from oscillator 11. From the resulting side bands, the local oscillator voltage and the voltage having the sum frequency are permitted to pass through filter 22 and through circulator 4 into TWT 1.

The amplified voltages then pass through circulator 5 into output mixer 15, where they are heterodyned at a high power level. From the resulting side bands the difference side band is selected by filter 18 and passed to output antenna 19. Once again, it is important to note the signal received at antenna 9 and departing from antenna 19 have the same frequency. Other spurious signals may be also radiated.

Thus, the signals outside TWT's band pass received at receiving antenna array 12 will be amplified and then retransmitted from transmitting antenna array 20.

The augmenter system described above is not fixed by the mentioned local oscillator frequency and frequency band pass of the filters. Many different combinations of frequency values and band-pass ranges may be used to accomplish the above described technique.

The above described system responds to both pulse and continuous wave radar signals. As an amplifier, this system is phase coherent, i.e. there is no phase distortion caused by the amplification process. This feature is achieved by utilizing a single local oscillator for both input and output mixers. It is to be noted that no direct connection need be made from the local oscillator 11 to the output mixer 15. The local oscillator signal feeds through the TWT, is amplified by the TWT, and heterodynes or beats with the amplified generated side-band signal in the output mixer 15 to produce the original frequency. Frequency stability of the local oscillator is not a critical factor for frequency drift will be compensated automatically since the frequency of input and output mixers are exactly the same.

If desired, the novel heterodyning technique may be used to exclude a discrete frequency from the spectrum, as well as bringing in frequencies laying outside TWT's band pass.

I claim:
1. The improvement in microwave radar augmenter systems for extending the low frequency receiving and transmitting capability of the system, the system to be improved having a first receiving antenna, a travelling wave tube amplifier, and a first transmitting antenna; the said system having a defined band pass with a defined lower frequency of operation, the said improvement comprising:
 (a) local oscillator means for providing a voltage having a fixed frequency, the said fixed frequency being within the said defined band pass;
 (b) a second receiving antenna means for receiving a predetermined frequency band of radar signals lower in frequency than the said defined lower frequency of said band pass of the system to be improved;
 (c) an input mixer means responsive to a received radar signal from the said second receiving antenna means and responsive to the said local oscillator means for providing at least one side-band voltage within the said defined band pass;
 (d) a first filter means cooperating with the said input mixer means for passing a predetermined band of frequencies, the said band containing the said side-band voltage and the said fixed frequency voltage of the said local oscillator;
 (e) a first microwave circulator means interposed in connecting relationship between the said first antenna and the said travelling wave tube and between the said first filter means and the said travelling wave tube, the said circulator means for passing the said side-band voltage and the said local oscillator voltage to the travelling wave tube whereby the travelling wave tube amplifies the said voltages;
 (f) a second microwave circulator means interposed in connecting relationship between the said travelling wave tube and the said first transmitting antenna;
 (g) output mixer means cooperating with the said second circulator means for heterodyning the said amplified side-band voltage and the said amplified local oscillator voltage to provide a heterodyned signal having the same frequency as the said received radar signal;
 (h) a second filter means for passing signals within a predetermined frequency band approximately equivalent in frequency to the said predetermined frequency band of the said second receiving antenna means; and
 (i) a second transmitting antenna means cooperating with the said second filter means for radiating signals passed by the said second filter means.

References Cited
UNITED STATES PATENTS

| | | | |
|---|---|---|---|
| 2,877,344 | 3/1959 | Dodington | 343—6.5 X |
| 2,943,318 | 6/1960 | Deloraine et al. | 343—6.8 X |
| 3,039,089 | 6/1962 | McMurtrey | 343—6.8 X |
| 3,226,714 | 12/1965 | Applegarth | 343—6.8 |
| 3,276,015 | 9/1966 | Lerwill et al. | 343—6.5 |

RODNEY D. BENNETT, *Primary Examiner.*

M. F. HUBLER, *Assistant Examiner.*